United States Patent [19]
Mirtain

[11] 3,854,853
[45] Dec. 17, 1974

[54] SEGMENTAL MOLD

[75] Inventor: Henri J. Mirtain, Compiegne, France

[73] Assignee: Uniroyal, a Societe Anonyme, Clairoix, France

[22] Filed: July 12, 1973

[21] Appl. No.: 378,456

[30] Foreign Application Priority Data
Aug. 25, 1972 France .............................. 72.30386

[52] U.S. Cl. .................................. 425/47, 425/46
[51] Int. Cl. .............................................. B29h 5/04
[58] Field of Search ............. 425/40, 46, 47, 17, 43, 425/37

[56] References Cited
UNITED STATES PATENTS

| 1,179,898 | 4/1916 | Coffey et al. ......................... 425/47 |
| 1,388,255 | 8/1921 | Hardeman ............................. 425/35 |
| 3,460,197 | 8/1969 | Cantarutti et al. ..................... 425/46 |
| 3,479,693 | 11/1969 | Cantarutti ............................. 425/40 |
| 3,778,203 | 12/1973 | MacMillan ......................... 425/47 X |
| 3,779,677 | 12/1973 | Greenwood ........................... 425/46 |

FOREIGN PATENTS OR APPLICATIONS

| 1,169,118 | 4/1964 | Germany ............................. 425/17 |
| 1,440,604 | 4/1966 | France ................................. 425/43 |
| 1,160,606 | 1/1964 | Germany ............................. 425/47 |
| 1,039,049 | 8/1966 | Great Britain ....................... 425/37 |

Primary Examiner—J. Howard Flint, Jr.
Attorney, Agent, or Firm—Philip Sands, Esq.

[57] ABSTRACT

A segmental mold comprising a pair of sidewall-shaping members coaxially confronting one another and supported such that at least one is movable axially relative to the other, and an annular array of tread-shaping segments concentrically interposed between the members and supported for movement axially in substantially parallel relation and radially from an open annular array wherein the segments are spaced from one another to a closed annular array of reduced extent wherein the segments abut one another.

8 Claims, 6 Drawing Figures

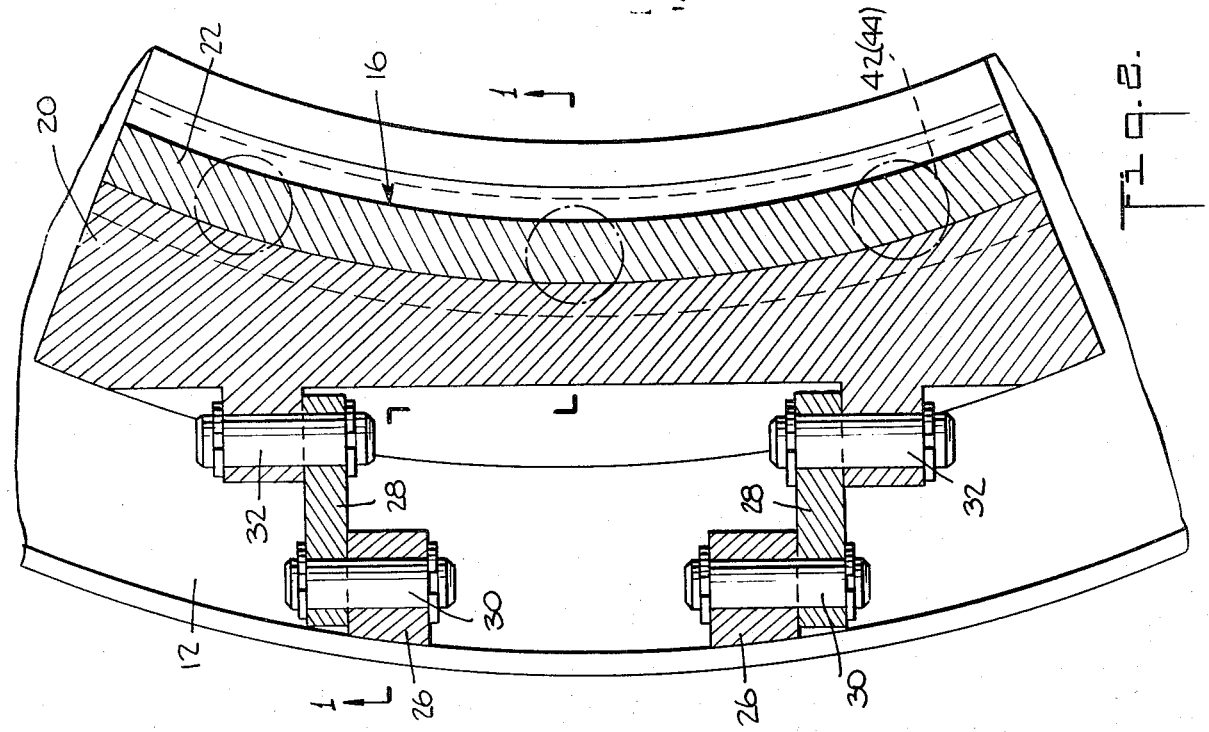
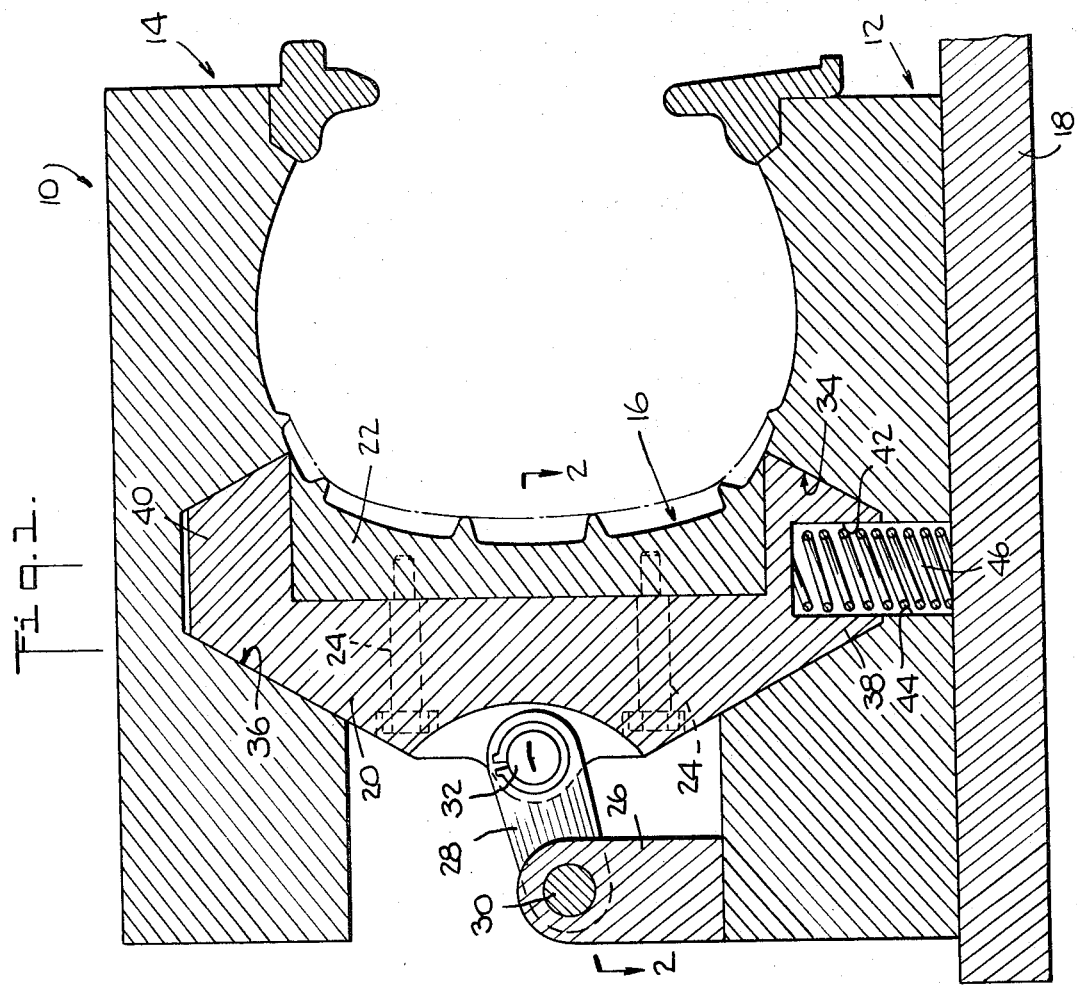

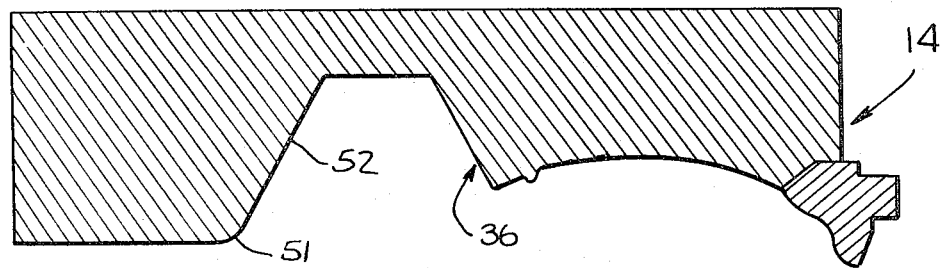
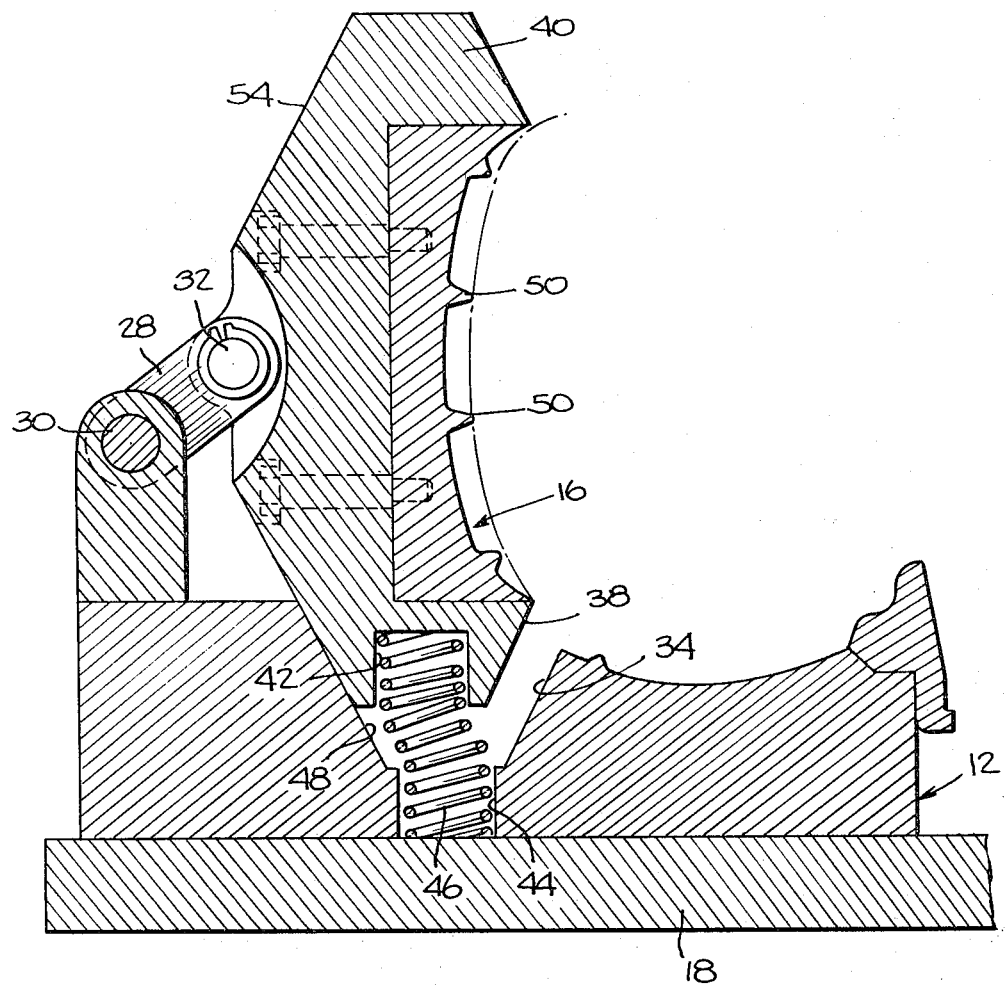

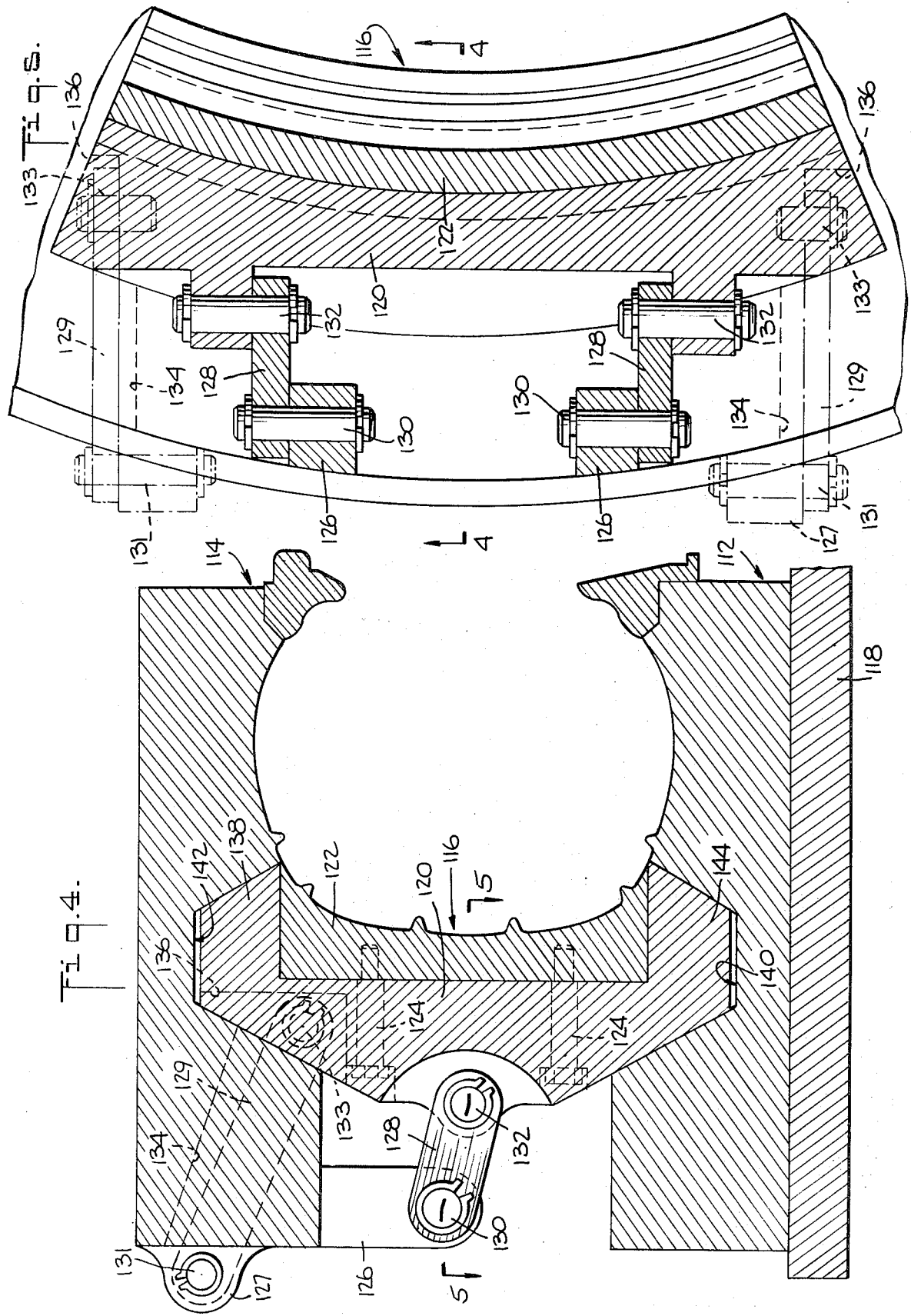

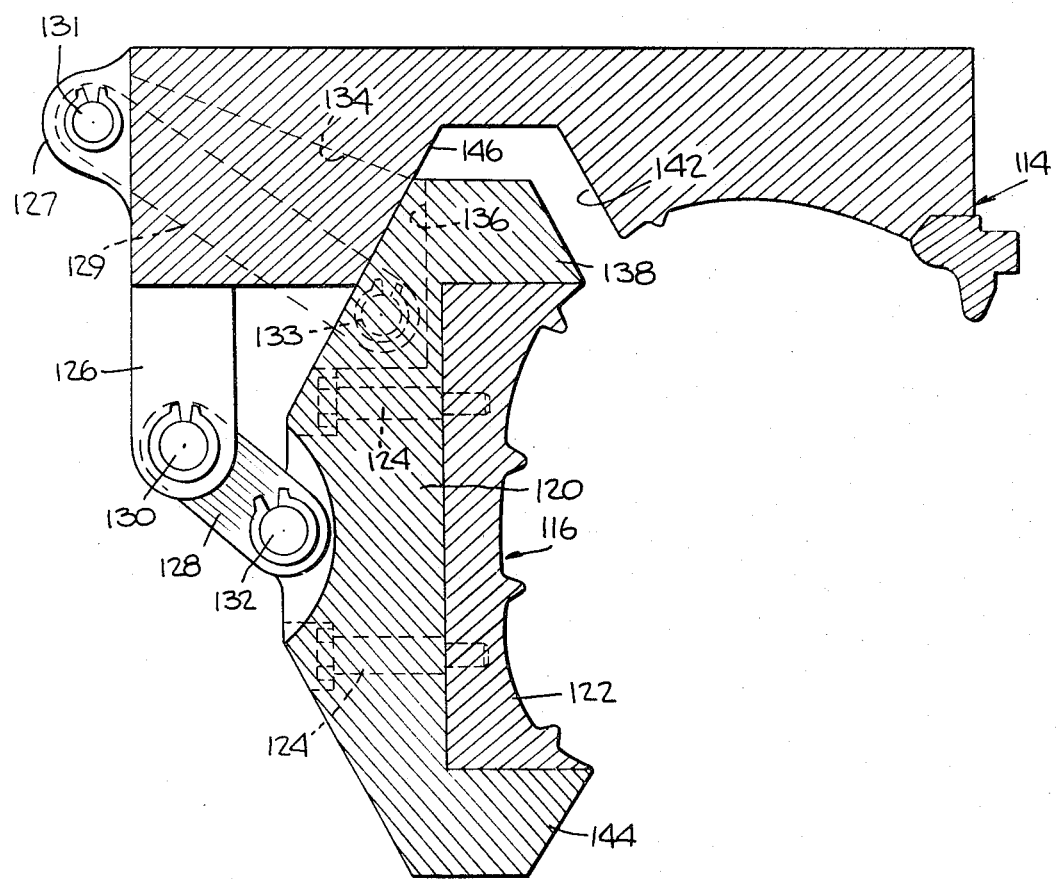
Fig. 6.
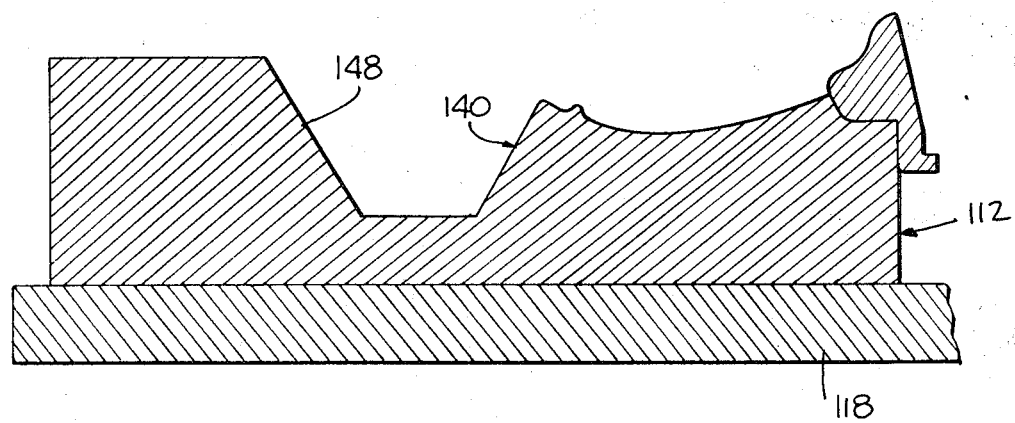

SEGMENTAL MOLD

BACKGROUND OF THE INVENTION

The present invention relates generally to tire curing presses, and more particularly to tire curing presses of the segmental mold variety.

Segmental molds in general are well known and usually comprise a pair of tire sidewall-shaping members between which is interposed and annular array of tire tread-shaping segments. The segments are movable radially from an open annular array wherein they are spaced from one another to a closed annular array of reduced extent wherein they abut one another. The sidewall-shaping members are movable axially toward and away from one another and often can be tilted to permit the insertion of an uncured tire carcass, or raw tire, therebetween. Presses of this nature employ an inflatable bladder for at least partially inflating the raw tire during the last stage of movement of the tread-shaping segments radially into a closed annular array, and thereafter for fully inflating the raw tire when the mold is in a completely closed condition to permit curing and vulcanization of the carcass.

It is a conventional expedient to provide the aforementioned presses with means for effecting radial displacement of the tread-shaping segment from an open annular array to a closed annular array of reduced extent as the sidewall-shaping members are axially moved into increasing proximity with one another and into opposing axial engagement with the tread-shaping segments. The means for achieving such an effect usually comprise various camming assemblies formed in one or the other of the sidewall-shaping members, and follower members slidably associated with the camming assemblies and connected to the tread-shaping segments, respectively.

One disadvantage associated with the latter arrangement is that the camming assemblies themselves effect the radial displacement of the segments and are subjected to a significant and undue degree of wear and deterioration along those surface portions which slide relative to one another. As the various surfaces of the camming assemblies wear relative to one another, the surfaces become less efficient and cannot precisely constrain the tread-shaping segments against movement during curing of the carcass. Thus, the segments do not remain in tight and flush circumferential abutment with one another during the curing process, thereby generating seam-like score lines in the carcass corresponding to the positions at which the segments circumferentially abut one another when in the closed annular array.

SUMMARY OF THE INVENTION

Accordingly, it is an object of the present invention to provide a segmental mold in which the sidewall-shaping members and the tread-shaping segments cooperate with one another in a manner as to diminish the extent of wear of those surface portions which slide relative to one another during opening and closing of the mold.

It is another object of the present invention to provide a segmental mold of the above type in which there is provided means for wedging the segments into a closed annular array to thereby constrain the latter against movement relative to one another during the curing of a carcass in the mold.

To this end, the present invention relates to a segmental mold having a pair of axially confronting sidewall-shaping members, and an annular array of tread-shaping segments interpositioned between the sidewall-shaping members. A linkage assembly is provided for pivotally connecting respective ones of the segments to one of the members. The linkage assembly acts to effect displacement of the segments radially from an open annular array wherein the segments are spaced from one another to a closed annular array of reduced extent wherein the segments abut one another and define a tire-curing mold cavity with the sidewall-shaping members. A cam-acting wedge assembly is interpositioned between and operatively associated with each of the sidewall-shaping members and the tread-shaping segments for initially assisting in radially displacing the segments simultaneously and subsequently removably constraining each of the segments against movement in the closed annular array.

BRIEF DESCRIPTION OF THE DRAWINGS

The above and additional objects and advantages of this invention will be more clearly understood from the following detailed description thereof, when read in conjunction with the accompanying drawings in which:

FIG. 1 is a fragmentary, vertical, cross-sectional view taken along the line 1—1 in FIG. 2 of the segmental mold pursuant to one embodiment of the present invention in a closed condition;

FIG. 2 is a fragmentary cross-sectional view taken along the line 2—2 in FIG. 1;

FIG. 3 is a view similar to FIG. 1 wherein the mold is an open condition;

FIG. 4 is a view similar to FIG. 1, but taken along the line 4—4 in FIG. 5 of a second embodiment of the present invention;

FIG. 5 is a view similar to FIG. 2, but taken along the line 5—5 in FIG. 4 of the second embodiment of the present invention; and FIG. 6 is a view similar to FIG. 3, but of the second embodiment of the present invention in an open condition.

DETAILED DESCRIPTION OF THE INVENTION

Referring now to the drawings, and more particularly to FIGS. 1–3, the present invention relates generally to a segmental mold 10 having preferably a lower fixed mold assembly 12, and an upper axially movable mold assembly 14. Interpositioned between the upper and lower assemblies is an annular array of tread-shaping segments, only a typical one of which is shown at 16. For example, there may be as few as four and as many as sixteen such segments 16. The lower assembly 12 may be characterized as a tire sidewall-shaping member which is supported upon a stationary platform 18. On the other hand, the upper assembly 14 may be likewise characterized as a tire sidewall-shaping member which is affixed to, for example, a fluid-actuated axially movable platen (not shown). Each of the tread-shaping segments 16 is comprised of a support element 20, preferably constituted of steel, and a supported element 22, preferably constituted of aluminum, which is detachably insertable into its corresponding support element 20. Each supported element 22 may be fastened to its corresponding support element 20, within a correspondingly cross-sectional concavity in the latter, such as by means of screws 24 or the like.

The lower sidewall-shaping member 12 is provided with a plurality of pairs of upstanding brackets 26, corresponding in pair number to the number of segments 16, to which are pivotally articulated respective links 28 by means of respective pins 30. The links 28 are in pairs also pivotally articulated to respective ones of the tread-shaping segments 16, such as by means of respective pins 32, for enhancing the pivotal stability of the segments 16. The present invention, however, contemplates the use of single links also, as opposed to the pairs of links 28, for interconnecting the segments 16 to the lower sidewall-shaping member 12.

The lower sidewall-shaping member 12 is provided with an annular cam-acting groove 34 which narrowingly tapers inwardly or downwardly. Similarly the upper sidewall-shaping member 14 is provided with an annular cam-acting groove 36 which narrowingly tapers inwardly or upwardly. Preferably, the grooves 34 and 36 each presents a truncated triangular cross-section. The grooves 34 and 36, which are wider at their respective open ends, are adapted to receive confronting ones of the opposite axial end portions of each of the segments 16. The opposite axial end portions are denoted by the reference characters 38 and 40, respectively, and are beveled to correspond in cross-section to and mate with the cross-sectional contour of the grooves 34 and 36 associated therewith.

Each of the segments 16, at its respective lower end portion 38 is provided with a preferably cylindrical recess 42 which coaxially confronts a corresponding receptacle 44 formed in the lower sidewall-shaping member 12. Each recess 42 and its corresponding receptacle 44 cooperate with one another for confining opposite end portions of a compression spring 46. Each compression spring 46 associated with a respective one of the segments 16, assists in separating its associated segment 16 from the lower sidewall-shaping member 12 and from the others of the segments 16 upon opening of the mold 10.

In operation, the upper sidewall-shaping member 14 is initially brought into a condition illustrated in FIG. 3 wherein it is elevated above and spaced axially from each of the segments 16. The mold 10 is thus in an open condition and permits an operator to insert a raw tire or carcass between the segments 16 so that it rests upon the lower stationary sidewall-shaping member 12. Each of the segments 16, however, is slightly radially spaced from the carcass because the springs 46 with which the segments 16 are associated urge each of the segments 16 to an upper position of, and into contact with, the outermost inclined wall 48 of the groove 34. As a result, the tread groove-forming projections 50 provided on each of the supported elements 22 of the segments 16 remains slightly radially spaced from the tread zone or crown of the uncured carcass.

The upper sidewall-shaping member 14 may then be actuated so that it descends toward the lower sidewall-shaping member 12. As the upper sidewall-shaping member 14 descends, a rounded lip 51 and outermost inclined wall 52 of the groove 36 engage and slide relative to a correspondingly inclined contoured surface 54 of each of the upper axial end portions 40 of the segments 16, respectively. Once the upper axial end portion 40 of each segment 16 is engaged by the inclined wall 52 of the annular groove 36, further descent of the upper sidewall-shaping member 14 will cause the lower axial end portion 38 of each segment 16 to slide downwardly along the outermost inclined wall 48 of the annular groove 34. The segments 16 will thereby move radially inwardly from an open annular array wherein each is spaced from the others to a closed annular array of reduced extent wherein each circumferentially abuts one another and presents, together with the upper and lower sidewall-shaping members, a closed mold cavity in which a raw tire may be cured.

It will be understood that the outermost inclined walls 48 and 52 of the annular grooves 34 and 36, respectively, cooperate simultaneously with corresponding ones of the axial end portions of the segments 16 and act as camming means for effecting radial displacement of the segments 16 toward one another. However, because of the provision of the links 28 which pivotally interconnect the segments 16 to the lower sidewall-shaping member 12, radial displacement of the segments 16 inwardly toward one another is not merely effected by means of the cam-acting inclined walls 48 and 52 of the annular grooves 34 and 36 respectively, but is assisted by the links 28 which have force components directed radially of the mold 10 for effecting radial displacement of the segments 16 toward one another.

Accordingly, since the links 28 and the inclined outermost walls 48 and 52 of the grooves 34 and 36, respectively, mutually assist one another to effect radial displacement of the segments 16 toward one another, there is less wear and deterioration of those surface portions of the segments 16 and the upper and lower sidewall-shaping members which slide relative to one another. Thus, the annular grooves 34 and 36 have an increased longevity for precisely wedging the opposite axial end portions 38 and 40 of each of the segments 16 thereinto, thereby preventing, for extended repetitive cycles, the segments 16 from moving relative to one another when the mold 10 is fully closed. Since the segments 16 are constrained against movement relative to one another, and remain in flush circumferential abutment with one another, there is a lesser likelihood to form seam-like score lines in the raw carcass corresponding to the positions at which the segments 16 abut one another.

Once the raw carcass has been fully cured, the upper sidewall-shaping member 14 may be elevated away from the lower sidewall-shaping member 12, thereby permitting each of the springs 46 to again separate and lift each of the segments 16 to the position illustrated in FIG. 3. The cured carcass may then be removed from the confines of the mold 10 and replaced with an uncured carcass.

Referring now to FIGS. 4–6, there is illustrated a second embodiment pursuant to the present invention. The second embodiment differs principally from the one illustrated in FIGS. 1–3 in the manner by which the segments are separated from one another and from the sidewall shaping members. In the embodiment of FIGS. 1–3, the segments 16 are separated from one another and from the lower sidewall-shaping member 12 by means of the compression springs 46 which urge the segments 16 upwardly. On the other hand, in the embodiment of FIGS. 4–6, the segments of the mold are so arranged as to separate gravitationally from one another and from the upper sidewall-shaping member.

In this respect, the mold pursuant to the second embodiment is denoted generally by the reference character 110 and includes a lower sidewall-shaping member 112 which is stationary and an upper sidewall-shaping member 114 movable axially toward and away from the lower sidewall-shaping member 112. Interpositioned between the upper and lower sidewall-shaping members is an annular array of tread-shaping segments, only a typical one of which is illustrated and denoted by reference character 116. The lower sidewall-shaping member 112 rests upon a lower stationary platform 118. On the other hand, the upper sidewall-shaping member 114 is actuated by hydraulic or pneumatic means (not shown) so that it may be moved toward or away from the lower sidewall-shaping member 112.

Each of the segments 116 includes a support element 120 and a supported element 122 which is insertable within a conformingly cross-sectioned concavity provided in its associated support element 120 and is fastened thereto such as by means of screws 124 or the like. At best illustrated in FIG. 5, each segment 116 is pivotally associated with the upper sidewall-shaping member 114 by means of two pairs of links. In this respect, a plurality of pairs of brackets 126 depend from the upper sidewall-shaping member 114, each bracket 126 pivotally supporting one end of a respective link 128 such as by means of a respective pin 130. The opposite end of each link 128 together with its spaced paired mate is pivotally articulated to an associated one of the segments 116 each by means of a respective pin 132. A second plurality of pairs of brackets 127 is likewise affixed to the upper sidewall-shaping member 114, each pair of brackets 127 extending above corresponding ones of the pairs of brackets 126 and radially outwardly or beyond the latter. Associated with each of the brackets 127 is a respective link 129 of greater length than the links 128, the links 129 each at one end thereof being pivotally articulated to a respective one of the brackets 127 by means of respective pins 131. The opposite end of each link 129 is together with its spaced paired mate pivotally articulated to an associated one of the segments 116 each by means of a respective pin 133. Appropiate side recesses 134 are provided in the upper sidewall-shaping member 114 to permit relative movement of an associated one of the links 129 therein. Likewise, appropriate corresponding side recesses 136 are provided in the upper axial end portion 138 of each of the segments 116 each for reception of one end portion of an associated link 129 and the pin 133 therefor.

The lower sidewall-shaping member 112 is provided with an annular groove 140 which is wider at the upper open end thereof. On the other hand, the upper sidewall-shaping member 114 is provided with an annular groove 142 which is wider at the lower open end thereof. It will be understood that the cross-sectional configuration of the lower annular groove 140 corresponds to and is complemental with the cross-section of the axial end portion 144 of each of the segments 116, whereas the cross-sectional configuration of the upper annular groove 142 corresponds to and is complemental with the cross-section of the upper axial end portion 138 of each of the segments 116.

The embodiment of FIGS. 4-6 operates and functions in a manner very much similar to that of the embodiment of FIGS. 1-3. In this respect, after a raw carcass is disposed between the segments 116 while the mold 110 is in the open condition illustrated in FIG. 6, the upper sidewall-shaping member 114 may be actuated to descend downwardly toward the lower sidewall-shaping member 112. The upper links 129 act to maintain the upper end portion 138 of each of the segments 116 in abutment with the outermost inclined wall 146 of the upper annular groove 142 while the mold 110 is open. Thus, when the upper sidewall-shaping member 114 is in an elevated condition illustrated in FIG. 6, the segments 116 gravitationally separate from one another and move downwardly relative to the upper sidewall-shaping member 114 to an at-rest position relative to the latter. The segments 116, however, remain in and in contact with the upper annular groove 142. Accordingly, the provision of the links 129 and their association with the links 128 obviates the need for the springs 46 which in the embodiment of FIGS. 1-3 effect separation of the segments from one another and from the sidewall-shaping member with which the segments are pivotally associated.

As the upper sidewall-shaping member 114 descends, each of the lower axial end portions 144 of the segments 116, respectively, projects into the lower annular groove 140 of the lower sidewall-shaping member 112. The outermost inclined wall 138 of the lower annular groove 140 is, however, initially engaged by the lower axial end portion 144 of each of the segments 116 and acts as a cam to effect radial displacement of the segments 116 toward one another as the upper sidewall-shaping member 114 descends further. Similarly, the inclined wall 146 of the groove 142 in the upper sidewall-shaping member 114 acts upon the upper axial end portion 138 of each of the segments 116 to effect radial displacemment of the latter toward one another.

In this embodiment likewise, the links, namely the links 128, assist the inclined outermost walls 146 and 148 of the upper groove 142 and lower annular groove 140, respectively, to effect simultaneous displacement of the segments 116 radially inwardly toward one another. Accordingly, there is greatly diminished surface wear and deterioration of these portions of the segments and sidewall shaping members which slide relative to one another. Thus, the lower annular groove 140 and upper annular groove 142 have a prolonged useful life for wedging and constraining each of the segments 116 in circumferential abutment with one another so as to diminish the likelihood of the formation of seam-like score lines in the carcass as the latter cures in the mold 110.

It will be understood, that the relationship of the axial end portions of each of the segments with the annular grooves in the sidewall-shaping members for tightly wedging the segments against movement relative to one another may be reversed such that the axial end portions of the segments are formed with grooves which are cooperable with corresponding annular beveled projections or rims extending from the upper and lower sidewall-shaping members, respectively.

Having thus set forth the nature of the invention, it will be understood that the foregoing description of the preferred embodiment is for purposes of illustration only, and that the various structural and operational features and relationships herein disclosed are susceptible to a number of modifications and changes none of which entails any departure from the spirit and scope of the present invention as defined in the hereto appended claims.

What is claimed is:

1. A segmental mold comprising: a pair of vertically spaced annular sidewall-shaping members coaxially confronting one another; means for moving one of said members axially relative to the other; an annular array of tread-shaping segments concentrically interposed between said members; and linkage means for pivotally connecting respective ones of said segments to one of said members, said linkage means cooperating with said segments for effecting displacement of the latter radially from an open annular array wherein said segments are spaced from one another to a closed annular array of reduced extent wherein said segments abut one another and define a tire-curing mold cavity with said members, the upper sidewall-shaping member including wedge means operatively associated with a corresponding axial end portion each of said segments for initially assisting in radially displacing said segments simultaneously and subsequently removably constraining each of the latter against movement relative to one another in said closed annular array, said linkage means including a plurality of pairs of links each of which at one end is pivotally articulated to the upper sidewall-shaping member and at the other end to a corresponding one of said segments, one link of each said pair being longer than the other and cooperating with the latter to limit gravitational displacement of its corresponding segment by swinging the latter into engagement with a lower portion of said wedge means upon axial separation of said sidewall-shaping members from one another.

2. A segmental mold as claimed in claim 1, wherein said wedge means includes an annular cam groove in one of said members, said corresponding axial end portion of each of said segments including a cross-sectional contour which complements and mates with the cross-sectional contour of said cam groove.

3. A segmental mold as claimed in claim 2, wherein said wedge means is also operatively associated with the other of said members and a corresponding opposite axial end portion of each of said segments, said wedge means further including a further annular cam groove in said other of said members, said corresponding opposite axial end portion of each of said segments including a cross-sectional contour which complements and mates with the cross-sectional contour of said further cam groove.

4. A segmental mold as claimed in claim 3, wherein said cam groove in each of said members tapers from a wide open end to a narrow closed end, the cam groove at least in said other of said members at its wide open end having a rounded lip engageable by the axial end portion of each of said segments associated therewith upon initial displacement of the latter into said closed annular array.

5. A segmental mold as claimed in claim 1, wherein each said longer link and each said shorter link of each said pair is associated with a corresponding link spaced therefrom in coaxial pivotal relation.

6. A segmental mold as claimed in claim 1, wherein each of said segments comprises a support element and a supported element removably insertable into said support element, each said supported element having an exposed tread-groove forming profile.

7. A segmental mold as claimed in claim 6, wherein each said support element is provided with a concavity between the opposite axial end portions thereof which conforms in cross-section to a corresponding cross-section of its associated supported element.

8. A segmental mold comprising: a pair of annular sidewall-shaping members coaxially confronting one another; means for moving one of said members axially relative to the other; an annular array of tread-shaping segments concentrically interposed between said members; linkage means for pivotally connecting respective ones of said segments to one of said members, said linkage means cooperating with said segments for effecting displacement of the latter radially from an open annular array wherein said segments are spaced from one another to a closed annular array of reduced extent wherein said segments abut one another and define a tire-curing mold cavity with said members; and wedge means operatively associated with at least one of said members and a corresponding axial end portion of each of said segments for initially assisting in radially displacing said segments simultaneously and subsequently removably constraining each of the latter against movement relative to one another in said closed annular array, said wedge means including an annular cam groove in one of said members, said corresponding axial end portion of each of said segments including a cross-sectional contour which complements and mates with the cross-sectional contour of said cam groove, said wedge means being also operatively associated with the other of said members and a corresponding opposite axial end portion of each of said segments, said wedge means further including a further annular cam groove in said other of said members, said corresponding opposite axial end portion of each of said segments including a cross-sectional contour which complements and mates with the cross-sectional contour of said further cam groove, said linkage means including respective pairs of links associated with each of said segments, one of said links in each pair being longer than the other and pivotally articulated to a movable one of said members and to a respective one of said segments at positions spaced from respective positions at which the shorter one of said links is pivotally articulated to said movable member and to the latter said respective segment, each longer one of said links being pivotally connected to an axial end portion of a respective one of said segments to effect gravitational displacement of the latter into engagement with an exterior wall of said cam groove in said movable member when the latter said member is withdrawn away from the other of said members.

* * * * *